United States Patent [19]

Bordignon

[11] Patent Number: 4,899,243
[45] Date of Patent: Feb. 6, 1990

[54] FLAT SPRING STRUCTURE FOR MAGNETIC TAPE CASSETTES, IN PARTICULAR VIDEO CASSETTES

[75] Inventor: Abramo Bordignon, Senago, Italy
[73] Assignee: A.T.B. S.p.A., Senago MI, Italy
[21] Appl. No.: 130,254
[22] Filed: Dec. 8, 1987
[30] Foreign Application Priority Data
 Dec. 23, 1986 [IT] Italy .............................. 24218/86[U]
 Dec. 23, 1986 [IT] Italy .............................. 24219/86[U]
[51] Int. Cl.⁴ ......................................... G11B 23/02
[52] U.S. Cl. .................................... 360/132; 242/197; 242/199
[58] Field of Search .................. 360/132; 243/197–200

[56] References Cited

U.S. PATENT DOCUMENTS

| | | | |
|---|---|---|---|
| 4,368,860 | 1/1983 | Goto | 242/197 |
| 4,619,420 | 10/1986 | Schoettle | 360/132 X |
| 4,629,144 | 12/1986 | Schoettle | 360/132 X |
| 4,662,579 | 5/1987 | Gelardi et al. | 360/132 X |
| 4,770,367 | 9/1988 | Carroll | 242/199 |

Primary Examiner—Stuart N. Hecker
Assistant Examiner—David J. Severin
Attorney, Agent, or Firm—Guido Modiano; Albert Josif

[57] ABSTRACT

Flat spring structure for magnetic tape cassettes, in particular video cassettes, which comprises an elastic lamina of elongate conformation which is coupleable at a middle portion thereof with the cover of a cassette and which acts, proximate to its free end on the central pivot of the reels supporting a magnetic tape. The peculiarity of the invention is constituted by the fact that the lamina at the side thereof facing the reels, has a concave piecewise conformation with at least one fold line in the portion defined between the free end and the zone of coupling with the cover. The fold line, with the lamina inserted into the cassette, engages by contact with the cover to define a fulcrum point for elastic oscillation of said lamina.

9 Claims, 2 Drawing Sheets

FLAT SPRING STRUCTURE FOR MAGNETIC TAPE CASSETTES, IN PARTICULAR VIDEO CASSETTES

BACKGROUND OF THE INVENTION

The present invention relates to a flat spring structure for magnetic tape cassettes, in particular video cassettes.

As is known, in video cassettes flat springs are currently used which engage with the pivots provided at the axis of rotation of the tape supporting reels.

In conventional embodiments, the flat springs are associated at their middle portion with the inner surface of the cover and act, by elastic pressure contact, on said pivots at the free ends of said flat springs.

The flat springs are currently manufactured according the most widely varying configurations starting from the elongated rhomboidal configuration to more recent configurations which substantially have an extension with a more reduced width.

In all the embodiments currently available on the market said flat springs, seen edgewise, have a substantially curved or piecewise configuration with the concavity facing towards the supporting reels.

Flat springs, according to universally adopted standards, must have such a shape as to exert on the reel, at the moment of their use, an elastic thrust at the contact pivot, which can be estimated, for example for the VHS system, at approximately 200 g.

With the known described arrangement, since the action and reaction points are merely constituted by the pivots for contact with the end of the lamina and by the central portion of the lamina itself, which is connected to the cover, from the point of view of the static calculation of forces, a force is exerted on the cover, at the point of contact with the lamina, which is directed towards the outside of the cover of the cassette and is equal to the sum of the two forces exerted on the lamina at the pivots, that is to say, an outwardly directed thrust is exerted on the cassette, in a point located in the central portion, which for example for the VHS system is approximately 400 g.

Calculating the various moments, the maximum resisting moment is located at the point of contact with the cassette, that is to say in the central region of the elastic lamina, and decreases to 0 at the region of contact with the pivot.

This arrangement of the forces causes the need to currently use springs which have a high elastic constant so that, from a constructive point of view, one must use laminae which have a relatively large width and thickness, with consequent considerable consumption of material for their manufacture.

SUMMARY OF THE INVENTION

The aim proposed by the invention is indeed to eliminate the above described disadvantages by providing a flat spring structure for video cassettes which radically alters conventional manufacturing criteria, offering the possibility of exerting the required elastic thrust on the pivot, though considerably reducing both the width and the thickness of the lamina which constitutes the spring.

Within the scope of the above described aim, a particular object of the invention is to provide a flat spring structure which allows inversion of the direction of reaction of the force at the region of connection of the reaction of the force at the region of connection of the flat spring to the cover of the cassette, with respect to conventional flat springs, since the obtainable component of reaction force is directed towards the interior of the cassette.

A further object of the invention is to provide a lamina which, in resting conditions before its assembly in the cassette, has a reduced camber, that is to say a reduced distance from the resting plane of the central portion, contrarily to the solutions of the prior art which, in order to have the required characteristics of elasticity, must have a high camber with the consequent need for elongation of the lamina in order to prevent any jamming during assembly.

Still another object of the present invention is to provide a flat spring structure which allows to considerably simplify all the manufacturing steps, while leading to the obtainment of a product with high quality characteristics.

Not least object of the present invention is to provide a flat spring structure which is easily obtainable starting from materials commonly available on the market and which is furthermore competitive from a merely economical point of view.

The above described aim, as well as the objects mentioned and others which will become apparent hereinafter, are achieved by a structure of a flat spring for cassettes of magnetic tape, in particular video cassettes, according to the invention, comprising an elastic lamina with an elongated configuration which is coupleable, in a middle proximate to its free ends, on the central pivot of the reels supporting the magnetic tape, characterized in that it has, on the side facing towards said reels, the configuration of a concave piecewise line with at least one fold line in the portion comprised between the free ends and the zone of coupling with the cover, said fold line, with said elastic lamina inserted in said cassette, being adapted to engage by contact with said cover to define at least one fulcrum point for the elastic oscillation of said lamina, said fulcrum point having a distance from said pivot of the reel which is smaller than the distance between said pivot and said zone of coupling with the cover.

BRIEF DESCRIPTION OF THE DRAWINGS

Further characteristics and advantages of the invention will become apparent from the detailed description of a flat spring structure for magnetic tape cassettes, in particular video cassettes, illustrated only by way of non-limitative example in the accompanying drawings, wherein.

DESCRIPTION OF THE PREFERRED EMBODIMENTS

Figure 1:
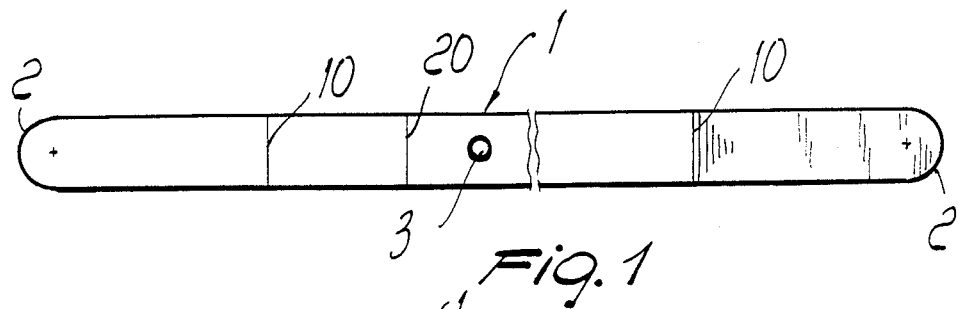
FIG. 1 is a schematic plan view of the flat spring, according to the invention.
Figure 2:
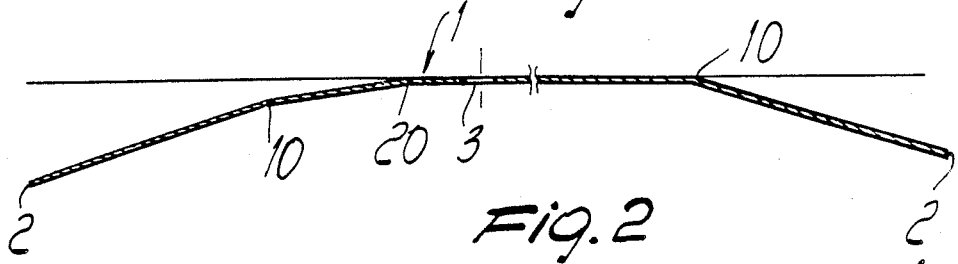
FIG. 2 is a longitudinal cross section view of the flat spring with a portion illustrating a spring with one fold and a portion illustrating a spring with two folds.

With reference to the above described figures, and in particular to FIGS. 1 to 4, the flat spring structure for magnetic tape cassettes, in particular video cassettes, according to the invention, comprises an elastic lamina, generally indicated by the reference numeral 1, which has a substantially elongated configuration. Preferably it is constituted by a strip of constant width which is rounded at its longitudinal ends 2.

In its central portion, the elastic lamina 1 is preferably provided with a through hole 3 for the coupling of an element 4 for fixing to the cover 5 of the cassette.

The lamina is inserted inside the cassette and is connected, as described, to the cover 5 and acts on the pivot 6 of a reel 7 which is rotatably supported, in a per se known manner, inside the container 8 of the video cassette or the like.

The important peculiarity of the invention resides in the fact that, seen edgewise, the elastic lamina 1 has the the fact that, seen edgewise, the elastic lamina 1 has the configuration of a concave piecewise line which is determined by a fold line 10 which is provided in a middle portion comprised between the free end of the spring and the region where the hole 3 for connection to the cover is provided.

Considering a flat spring for VHS cassettes, the distance between the axes of the reel pivots is approximately 92 mm; in order to obtain good results, the flat part delimited by the two fold lines 10 disposed symmetrically with respect to the hole 3 or zone of coupling with the cover, must be between 32 and 60 mm, i.e. in each of the two arms, the fold line 10 must be spaced from the anchorage point or axis of the cover by a distance of 16 to 30 mm. Furthermore, it has been shown that by increasing the flat part, one has the possibility, while maintaining equal elastic characteristics, of reducing the thickness of the lamina.

From experimental tests performed, it has been observed that the best results are achieved by providing said fold line, which is transverse to the longitudinal extension of the elastic lamina, substantially at half the length between the point of contact between the lamina and the pivot and the point of connection of the lamina to the cover.

In particular circumstances of application, maintaining the above described characteristics of functionality, it is possible to provide an initial fold line 20 which is advantageously provided proximate to the hole 3 at a distance which is approximately one sixth of the distance between the hole 3 and the end of the lamina in contact with the pivot.

Figure 3:
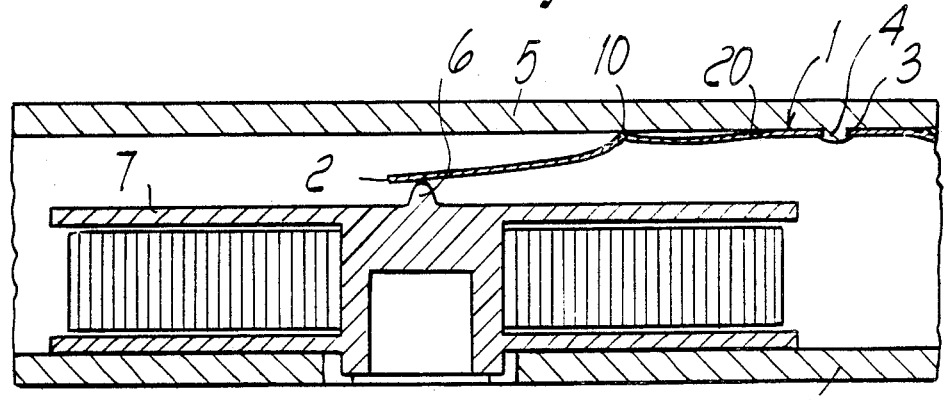
FIG. 3 is a view of the flat spring applied to the interior of a video cassette, in a condition of rest.
Figure 4:
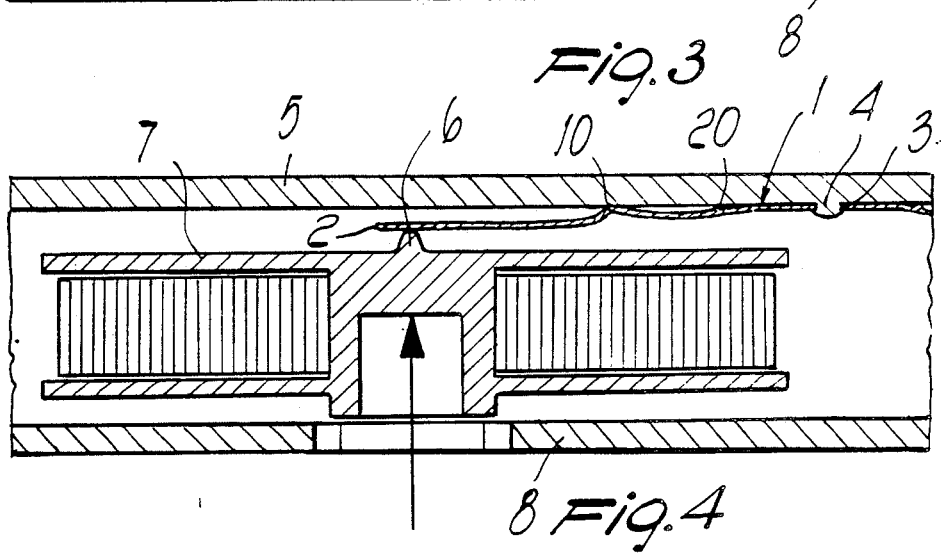
FIG. 4 is a view of the flat spring applied to the interior of a video cassette, in a condition of use of the cassette.
Figure 5:
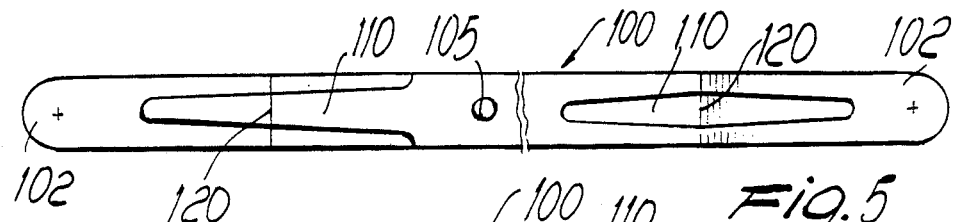
FIG. 5 is a schematic top plan view of the flat spring, according to the invention, with a part having one type of ridge and a part having a different and equivalent type of ridge.
Figure 6:
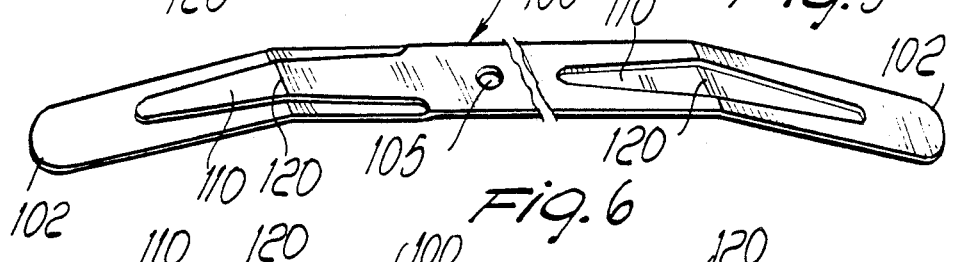
FIG. 6 is a perspective view of the flat spring with ridges.
Figure 7:
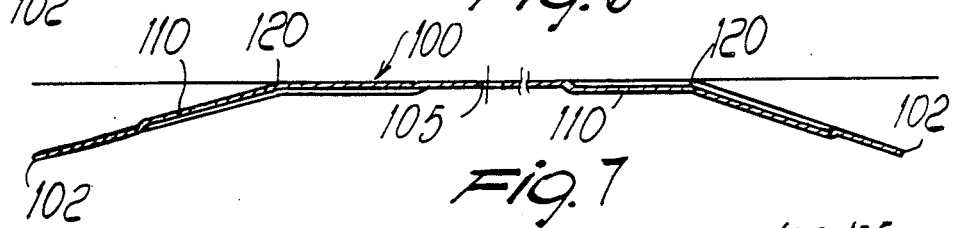
FIG. 7 is a view of the flat spring with ridges in longitudinal cross section.
Figure 8:
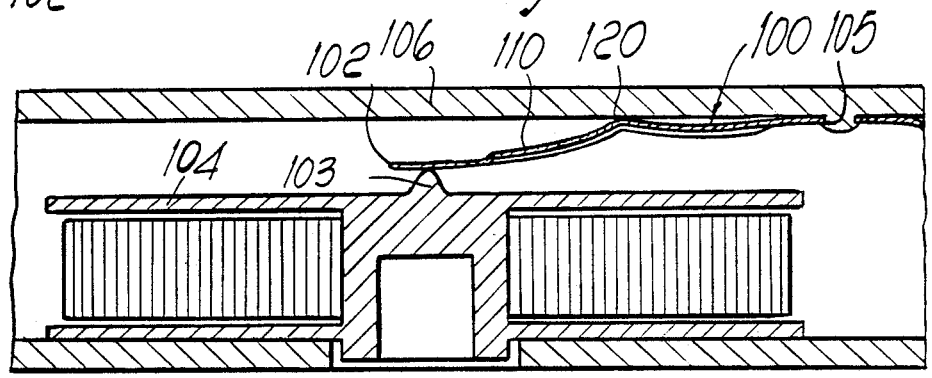
FIG. 8 is a cross section view of the flat spring with ridges inserted in a video cassette,, in a condition of rest.
Figure 9:
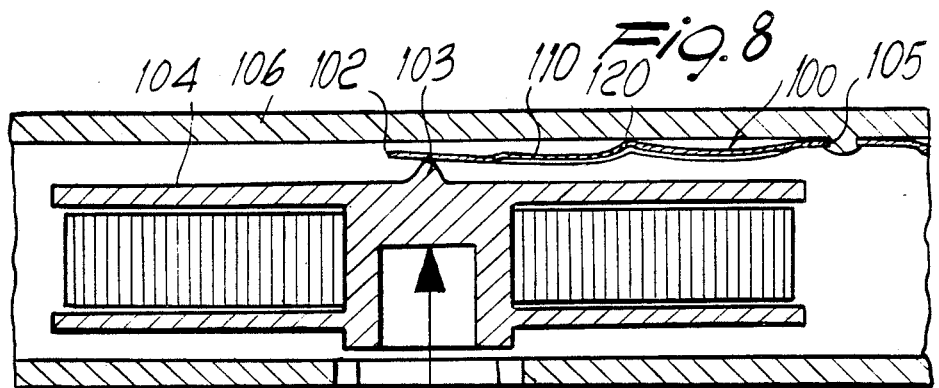
FIG. 9 is a cross section view of the flat spring with ridges inserted into a cassette, in a condition of use.

With this type of configuration of the lamina, as more clearly illustrated in FIGS. 3 and 4, when the lamina is introduced into the cassette, the fold line 10 is arranged in contact with the inner surface of the cover, providing in practice a fulcrum point with a reduced lever arm for the elastic oscillation of said lamina.

Observing the diagram of the forces, it is seen that in having to exert, for example for a VHS cassette, an elastic thrust of approximately 200 g on the pivot 6 of the reel, said force is counterbalanced by a similar force, directed towards the outside of the cassette, at the fulcrum zone determined by the point of contact of said fold line 10, while at the region of coupling of the rivet or the like in practice there is an inversion of the force with respect to conventional solutions, since the force is directed from outside inwards.

Moreover, in the region of contact with the pivot 6 the lamina is arranged itself substantially parallel to the cover 5, thereby exerting a force which is axially aligned with the reel 7.

As to the diagram of moments, it reaches the maximum point substantially at the fold line 10, at a value which is significantly lower than the maximum point of the moment of traditional flat springs since, the forces involved being equal, the lever arm is halved.

Furthermore, the diagram of moments is inverted in the portion comprised between the point of contact of the lamina with the cover and the pivoting zone to have a moment with opposite sign at the hole 3.

This fact is considerably important since, by considerably reducing the moments to be counterbalanced by the flat spring, the possibility is allowed, the elastic force exerted on the pivot of the reel being equal, of considerably reducing the thickness and the width of the lamina, considerably reducing the amount of material used to manufacture the lamina with respect to conventional solutions.

In order to obtain a reduction of the material utilized, as illustrated in FIGS. 5 to 9, the flat spring structure for magnetic tape cassettes, in particular video cassettes, according to the invention, comprises an elastic lamina, generally indicated by the reference numeral 100, which, in preferred embodiment, has an elongated configuration with a width which is substantially constant along its entire longitudinal extension.

Said lamina 100 is insertable inside a video cassette so that its free ends, where rounded portions 102 are provided, act by contact at the pivot 103 provided on the axis of the reel 104.

In its middle portion, the elastic lamina 100 is provided with a through hole 105 where means for connection to the inner surface of the cover 106 of the video cassette can be coupled.

The peculiarity of the invention resides in the fact that, in order to stiffen the lamina so as to obtain the required elastic thrust on the reel, while further reducing the thickness of said lamina, so as to reduce the material used, ridges are provided on the lamina.

More in detail, the ridges 110 extend longitudinally on said lamina starting from the region where the hole 105 is provided and reach proximate to the zone of contact with the pivot 103.

More specifically, said ridges can be provided by stamping operations, so as to modify the surface continuity and linearity of the lamina according to conventional criteria, thereby obtaining a considerable stiffening with consequent increase in its characteristics of elasticity. Said ridges can be provided protruding from the face directed towards the reels or towards the opposite face with the criterion of having the greatest ridge in the region where the greatest moment of flexure is exerted. Said ridges extend symmetrically starting from the central zone with a width which preferably decreases towards the ends for acting on the pivots 103, since in known solutions the greatest stresses generally occur at the central portions of the lamina.

The presence of the ridges in the zone where the greatest moment of flexure of the lamina occurs is applicable to laminae having any currently adopted configuration.

In order to further increase the elastic characteristics of the lamina, said lamina is provided, in a portion comprised between the zone where the hole 105 is provided and the end in contact with the pivots 103, with at least one fold 120, so that said lamina assumes the configuration of a piecewise line concave on the face directed towards the reels 103.

Moreover, it is possible to further reduce the thickness and the width of the lamina by virtue of the fact that said lamina is provided with ridges by means of the ridge 110 which creates a significant stiffening of the lamina, which is obtainable even with metallic materials which are less valuable than stainless steel, though being capable of achieving the intended functional requirements.

From the above it is thus apparent that the invention achieves the intended aim and objects, and in particular the fact is stressed that the provision of the flat spring with a piecewise line configuration allows to obtain a better distribution of the forces, with respect to conventional springs which generally have a curved shape which causes the discharging of the forces substantially entirely at the central region of coupling of the lamina to the cover.

In fact, any piecewise-line springs available on the market are merely a constructive simplification of curved springs, since any folding lines provided do not constitute a pivoting point for elastic oscillation.

In practice, while the best results have been obtained using metallic materials, the materials employed and the dimensions and contingent shapes may be any according to the requirements.

I claim:

1. Flat spring structure for magnetic tape cassettes, in particular video cassettes, comprising an elastic lamina with an elongated configuration which is coupleable, at a middle portion thereof, with the cover of a cassette and acting, proximate to its free ends, on the central pivot of the reels supporting the magnetic tape, said spring comprising, on the side facing towards said reels, the configuration of a concave piecewise line with at least one fold line in the portion comprised between the free end and the zone of coupling with the cover, said fold line, with said elastic lamina inserted in said cassette, being adapted to engage by contact with said cover to define at least one fulcrum point for elastic oscillation of said lamina, said fulcrum point having a distance from said pivot of the reel which is smaller than the distance between said pivot and said zone of coupling with the cover.

2. Flat spring structure, according to claim 1, wherein said flat spring has a substantially constant width for its entire longitudinal extension.

3. Flat spring structure, according to claim 1, wherein the portion of said lamina, defined between said fold line and said zone of coupling with the cover, is between 35 and 65% of the portion of said lamina, defined between said zone of coupling with the cover and the point of engagement with said pivot.

4. Flat spring structure, according to claim 1, wherein said fold line is arranged substantially at half the distance between the zone of coupling with said cover and the point of contact with said pivot.

5. Flat spring structure, according to claim 1, wherein at said zone of coupling with the cover, it exerts on said cover a force directed from the outside towards the inside of said cassette.

6. Flat spring structure, according to claim 1, comprising an initial fold arranged substantially proximate to said zone of coupling with the cover.

7. Flat spring structure, according to claim 6, wherein said initial fold is arranged substantially at one sixth of the distance defined between said zone of coupling with the cover and the point of engagement with said pivot.

8. Flat spring structure for magnetic tape cassettes, in particular video cassettes, comprising an elastic lamina with an elongated configuration which is coupleable, at a middle portion thereof, with the cover of a cassette and acting, proximate to its free ends, on the central pivot of the reels supporting the magnetic tape, said spring structure further comprising at least one stiffening ridge extending along said elastic lamina for at least one longitudinal portion in the region in which the greatest moment of flexure of the lamina is exerted, wherein said ridge is obtained by plastic deformation of the material, and wherein said flat spring structure further comprises at least one fold line affected by said ridge and provided at the portion comprises between the free end and said zone of coupling with the cover, said fold line, with said elastic lamina inserted in said cassette, being adapted to engage by contact with said cover to define a fulcrum point for the elastic oscillation of said lamina, said fulcrum point having a distance from said pivot of the reel which is smaller than the distance between said pivot and said zone of coupling with the cover.

9. Flat spring structure, according to claim 8, wherein said at least one fold line of said lamina with the ridge is defined substantially at half the distance provided between said zone of coupling with the cover and said pivot of the reel.

* * * * *

REEXAMINATION CERTIFICATE (1810th)
United States Patent [19]
Bordignon

[11] B1 4,899,243
[45] Certificate Issued  Oct. 13, 1992

[54] FLAT SPRING STRUCTURE FOR MAGNETIC TAPE CASSETTES, IN PARTICULAR VIDEO CASSETTES

[75] Inventor: Abramo Bordignon, Senago, Italy

[73] Assignee: A.T.B. S.p.A., Milan, Italy

Reexamination Request:
No. 90/002,277, Feb. 11, 1991

Reexamination Certificate for:
Patent No.: 4,899,243
Issued: Feb. 6, 1990
Appl. No.: 130,254
Filed: Dec. 8, 1987

[30] Foreign Application Priority Data

Dec. 23, 1986 [IT] Italy ............... 24218/86[U]
Dec. 23, 1986 [IT] Italy ............... 24219/86[U]

[51] Int. Cl.$^5$ ............................ G11B 23/02
[52] U.S. Cl. .............. 360/132; 242/197; 242/199
[58] Field of Search .......... 360/132; 242/197-200

[56] References Cited

U.S. PATENT DOCUMENTS

| | | | |
|---|---|---|---|
| 4,368,860 | 1/1983 | Goto | 242/197 |
| 4,436,256 | 3/1984 | Saitoh | 242/200 |
| 4,449,676 | 5/1984 | Ogata et al. | 242/198 |
| 4,496,118 | 1/1985 | Oishi et al. | 242/198 |
| 4,544,062 | 10/1985 | Maehara | 242/199 X |
| 4,619,420 | 10/1986 | Schoettle | 360/132 X |
| 4,629,144 | 12/1986 | Schoettle | 360/132 X |
| 4,662,579 | 5/1987 | Gelardi et al. | 360/132 X |
| 4,685,638 | 8/1987 | Satoyoshi et al. | 242/199 |
| 4,717,091 | 1/1988 | Schoettle | 360/132 X |
| 4,770,367 | 9/1988 | Carroll | 242/199 |
| 4,773,615 | 9/1988 | Carroll | 242/199 |
| 4,819,890 | 4/1989 | Carroll | 242/199 |
| 4,974,791 | 12/1990 | Carroll | 242/199 |

FOREIGN PATENT DOCUMENTS

| | | | |
|---|---|---|---|
| 0042385 | 3/1980 | Japan | 242/199 |
| 0103987 | 8/1981 | Japan . | |
| 0006978 | 1/1986 | Japan . | |
| 2089765 | 6/1982 | United Kingdom | 242/199 |
| 2104872 | 3/1983 | United Kingdom | 242/199 |

*Primary Examiner*—David J. Severin

[57] ABSTRACT

Flat spring structure for magnetic tape cassettes, in particular video cassettes, which comprises an elastic lamina of elongate conformation which is coupleable at a middle portion thereof with the cover of a cassette and which acts, proximate to its free end on the central pivot of the reels supporting a magnetic tape. The peculiarity of the invention is constituted by the fact that the lamina at the side thereof facing the reels, has a concave piecewise conformation with at least one fold line in the portion defined between the free end and the zone of coupling with the cover. The fold line, with the lamina inserted into the cassette, engages by contact with the cover to define a fulcrum point for elastic oscillation of said lamina.

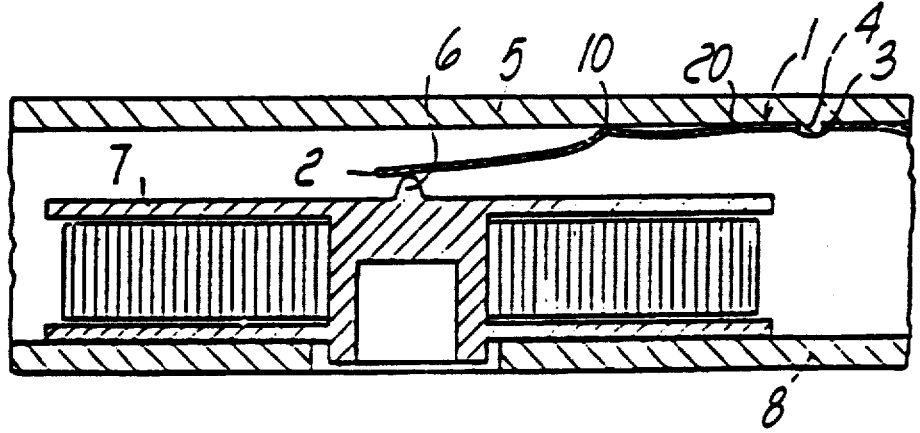

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *